United States Patent [19]
Botich

[11] Patent Number: 5,581,903
[45] Date of Patent: *Dec. 10, 1996

[54] APPARATUS FOR HEATING PURGE GAS AND TRANSMITTING MICROWAVE ENERGY FOR DESICCANT REGENERATION

[76] Inventor: Leon A. Botich, 10125 E. Tanglewood Cir., Palos Park, Ill. 60464

[*] Notice: The term of this patent shall not extend beyond the expiration date of Pat. No. 5,429,665.

[21] Appl. No.: 343,251

[22] Filed: Nov. 22, 1994

[51] Int. Cl.⁶ .................................................. F26B 3/34
[52] U.S. Cl. .................. 34/264; 34/265; 95/123; 95/126; 96/126; 96/144
[58] Field of Search .................... 34/80, 81, 264, 34/265; 96/126, 144; 95/99, 105, 122, 123, 126

[56] References Cited

U.S. PATENT DOCUMENTS

| | | | |
|---|---|---|---|
| 4,008,058 | 2/1977 | Wischer et al. | 96/126 |
| 4,322,223 | 3/1982 | Christel | 95/105 |
| 4,805,317 | 2/1989 | Inglis et al. | 34/80 |
| 5,429,665 | 7/1995 | Botich | 95/105 |

*Primary Examiner*—F. Daniel Lopez
*Attorney, Agent, or Firm*—Potthast & Ring

[57] ABSTRACT

An improved regenerative gas drying system (30) having an adsorbing chamber (36) and a regenerating chamber (46) with both chambers containing desiccant (38) in which the adsorbing chamber (36) receives wet gas (31) for adsorption of moisture by the desiccant (38) contained therein to create a drier gas (40) and in which a portion of the drier gas (40) exits the adsorbing chamber (36) and is directed and carried to the regenerating chamber (46) to dry the desiccant (38) contained within the regenerating chamber (46). A chamber drier gas heating apparatus has a conduit (55) disposed within the desiccant (38) of the regenerating chamber (46) in which the conduit (55) carries the drier gas (40) directed from the adsorbing chamber (36) to the regenerating chamber (46) and includes a microwave antenna (48) in communication with microwaves (50) generated by a microwave generator (54) coupled with the antenna (48) in which at least a portion of the antenna (48) is positioned within desiccant (38) contained in the regenerating chamber (46). A method is further provided for positioning a conduit (55) within the desiccant (38) of the regenerating chamber (46) in which the conduit (55) carries the drier gas (40) directed from the adsorbing chamber (36) to the regenerating chamber (46) and positioning a microwave antenna (48) in communication with microwaves (50) generated by a microwave generator (54) coupled with the antenna (48) in which at least a portion of the antenna (48) is positioned within desiccant (38) contained in the regenerating chamber (46).

24 Claims, 4 Drawing Sheets

APPARATUS FOR HEATING PURGE GAS AND TRANSMITTING MICROWAVE ENERGY FOR DESICCANT REGENERATION

BACKGROUND OF THE INVENTION

1. Field of the Invention

This invention relates generally to the field of regenerative gas or air drying systems and more particularly to such regenerative gas or air drying systems which employ a desiccant contained in a chamber to adsorb moisture of the wet gas inserted into the chamber to dry the gas and in which dry purge gas is subsequently inserted into the chamber to regenerate saturated desiccant which had absorbed the moisture in drying the previously inserted wet gas.

2. Description of the Related Art Including Information Disclosed Under 37 C.F.R. §1.97–1.99

Drying devices which receive a wet gas under pressure such as air containing a high level of moisture are well known. These gas drying devices are commonly used in many industrial applications such as spray painting, pneumatic control systems and air operated equipment. It is also known in such devices to utilize a desiccant such as activated alumina, carbons, silica gels or molecular sieves located in a chamber to adsorb and remove the moisture from the inlet inserting the wet air under pressure to one end of the chamber. Such air drying devices frequently use a portion of the dried air also called a purge gas from one desiccant chamber that is drying air to regenerate the desiccant in another chamber that has already removed moisture from the wet air earlier. The portion of dried air or purge gas is often diverted to a heater to elevate the temperature of the purge gas. Thereafter, the heated purge gas is moved to the other desiccant chamber to dry out and regenerate the saturated desiccant located therein.

These known regenerative gas drying devices typically use a dual chamber system in which wet gas is received through an inlet at the top of one of the chambers. As the wet gas migrates through the chamber, moisture is adsorbed by the desiccant thereby drying the gas. The majority of the dried gas is carried to a gas outlet thereby leaving the gas drying system. However, a small portion of the gas called purge gas is diverted to a transport pipe which carries the dry gas to a heater.

The purge gas is heated and transported to the other chamber which is operating to regenerate or dry out the previously adsorbed desiccant. The heated purge gas dries the saturated desiccant in the other chamber during the regeneration cycle. The high moisture air resulting from the drying of the saturated desiccant is removed from the other chamber at an opposite end from the end which receives the purge gas.

Once the desiccant in the first chamber drying the wet gas is sufficiently saturated during the air drying cycle and the desiccant in the other chamber is dried out during the regeneration cycle, the cycles are reversed by flipping diverter valves interposed between the two pressure chambers. The dry and heated purge gas received from the other chamber drying wet air is, in turn, used to dry and regenerate the saturated desiccant in the first chamber. These drying systems are cycled back and forth in this manner to continuously dry out the wet gases and regenerate desiccant.

Disadvantageously, many problems arise in employing such known gas drying systems. A significantly large percentage of the dried air must be used for purge in order to regenerate the saturated desiccant. This results in an inefficient use of the dried air since a high percentage of it must be used as purge to dry saturated desiccant instead of being used right away or collected, contained and sold for industrial purposes. Furthermore, the high percentage of the diverted dry air must be heated by heaters which utilize large quantities of energy and operate at very high temperatures. The high temperatures can precipitate fire hazards particularly when such heaters are in close proximity to oil lubricated compressors used in conjunction with these systems to pressurize the desiccant chambers.

Attempts have been made to dry material in a cylindrical receptacle by subjecting the material to electromagnetic waves. In U.S. Pat. No. 4,339,648 to Jean issued Jul. 13, 1982, an antenna extends the entire length of a single receptacle to provide radiation energy from top to bottom of the receptacle. Jean also shows a coiled antenna which extends along a helix inside the receptacle. Jean, however, is not used in a dual chamber regenerative gas drying system in which dry purge gas is inserted at one end of one chamber regenerating desiccant. Disadvantageously, the antenna of Jean extends the entire length of the chamber which inefficiently wastes radiant energy on areas which are relatively dry in regenerative gas drying systems and which do not necessarily need such radiant energy. Since the apparatus of Jean is not employed in a regenerative gas drying system, it does not concentrate the distribution of energy on areas within the chamber which require the most heat to regenerate saturated desiccant contained therein.

Attempts have further been made to transmit microwave energy into pressurized tanks in regenerative gas drying systems to heat gases adsorbed by desiccant materials contained therein. In U.S. Pat. No. 4,312,640 to Verrando issued Jan. 26, 1982, and U.S. Pat. No. 4,312,641 to Verrando issued Jan. 26, 1982, microwave energy is passed through microwave pressure windows and into tanks carrying sorbent or desiccant material. The microwaves are used to release and remove a polar gas adsorbed by sorbent or desiccant material in the tanks. The microwave energy is prevented from being sent into the tanks in response to the desorbtion of the moisture from the sorbent material. Purge gas is still moved through the desorbing desiccant until the moisture level of the chamber is adequately lowered.

In U.S. Pat. No. 4,322,394 to Mesey et. al. issued Mar. 30, 1982, microwave energy is used to dielectrically heat saturated solids of noncarbon adsorbents for the removal of adsorbed materials. The microwaves heat the adsorbents internally to bring the adsorbents to a temperature for desorbing some of the adsorbate in the absence of any activating or purge gas.

Disadvantageously, in these systems the distribution of the microwave energy within the pressurized tanks is limited. Furthermore, there is continued inefficient use of purge gas to aid in the drying cycle for regenerating desiccant contained therein. The microwave energy in such devices which is sent through pressure windows adjacent the tank enhances the ability of removal of the adsorbed material proximate to the pressure windows. However, since these known air drying systems do not sufficiently disperse the microwaves through concentrated areas of high saturation in the tank, the material adsorbed by the desiccant located away from the pressure windows does not get sufficiently energized by the microwaves to efficiently adsorb the adsorbate material. Thus, desorbtion of wet gas is achieved only at locations proximate to the pressurized windows while desiccant further away from the pressure windows does not receive effective and beneficial microwave energy for desorbtion. Additionally, such systems do not use microwave energy to ultimately heat dry gas which is inserted into the regenerating tank as purge.

SUMMARY OF THE INVENTION

Accordingly, it is the principal object of the present invention to provide a regenerative gas drying system which overcomes the problems of known gas drying systems by efficiently utilizing microwave energy and purge gas during a regeneration cycle to desorb moisture absorbed by desiccant in a chamber.

Another object of the present invention is to provide a conduit disposed within the desiccant of the regenerating chamber in which the conduit carries the drier gas directed from the adsorbing chamber to the regenerating chamber and provide a microwave antenna in communication with microwaves generated by a microwave generator coupled with the antenna in which at least a portion of the antenna is positioned within desiccant contained in the regenerating chamber which will cause desorbing of moisture carried by the desiccant in the regenerating chamber and heating of the dry gas carried by the conduit.

Another object of the present invention includes providing a method for positioning a conduit within the desiccant of the regenerating chamber in which the conduit carries the drier gas directed from the adsorbing chamber to the regenerating chamber and positioning a microwave antenna in communication with microwaves generated by a microwave generator coupled with the antenna in which at least a portion of the antenna is positioned within desiccant contained in the regenerating chamber which causes the desorbing of moisture carried by the desiccant in the regenerating chamber and heating of the drier gas carried by the conduit.

BRIEF DESCRIPTION OF THE DRAWINGS

The foregoing objects and advantageous features of the invention will be explained in greater detail and others will be made apparent from the detailed description of the preferred embodiments of the present invention which are given reference to the several figures of the drawing, in which.

DESCRIPTION OF THE PREFERRED EMBODIMENT

Figure 1:
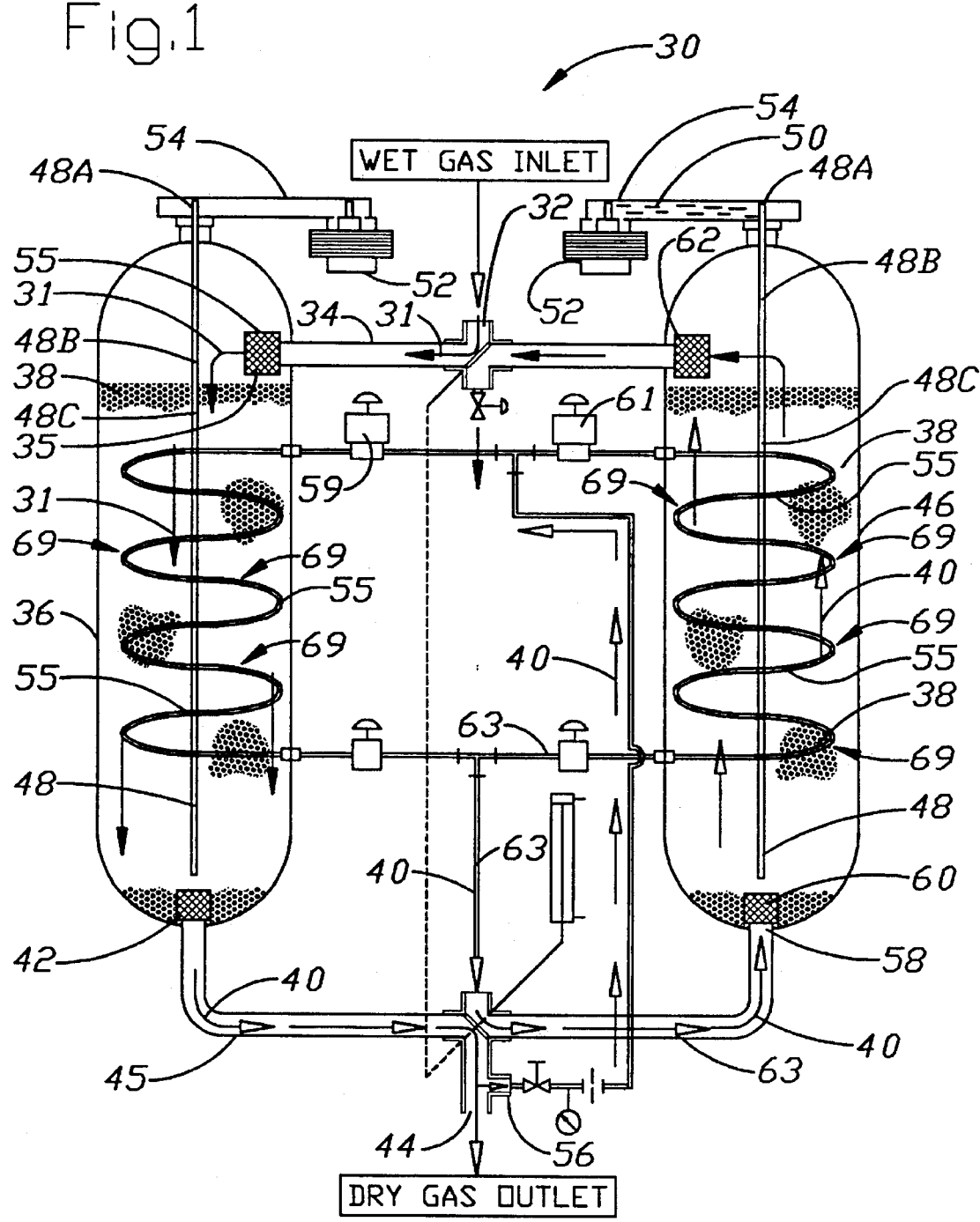
FIG. 1 is a schematic view of the regenerative gas drying system of the present invention.

Referring to FIG. 1, regenerative gas drying device 30 is shown in which wet gas 31 (illustrated by solid arrows) enters through wet gas inlet 32 and is introduced through channel 34 and screen 35 into adsorbing or gas drying chamber 36 containing desiccant material 38. The desiccant 38 contained in chamber 36 adsorbs moisture from the wet gas 31 in order to dry the wet gas. The drier or dried gas 40 (illustrated by hollow arrows) exits the chamber 36 through screen 42 and is carried to dry gas outlet 44 at which dry gas 40 leaves the regenerative gas drying system 30. These regenerative gas drying systems 30 are commonly used to dry wet air, however, other gases can be similarly or analogously treated with use of these types of devices. In addition, the chambers that hold the desiccant often have gas under pressure introduced into the chamber in either the adsorption procedure and the regeneration procedure or both, however, the present invention would also be contemplated to work not only with chambers utilizing gas under pressure but also in ambient or nonpressurized environments.

As the one drying or adsorbing chamber 36 dries out wet gas 31, regenerating chamber 46 of drying system 30 removes moisture adsorbed by desiccant 38 contained in the regenerating chamber 46. Desiccant 38 of regenerating chamber 46 was saturated with moisture when wet air was previously passed through regenerating chamber 46 in an earlier gas drying cycle. In regenerative gas drying systems 30 both chambers 36 and 46 cycle back and forth while drying gas in the former the latter is drying desiccant and once the former chamber is saturated the cycle reverses and the former chamber is now a regenerating chamber drying out the desiccant while the latter is drying wet gas. This cycling back and forth assists in providing a more continuous production of dry gas.

Disposed within each chamber 36 and 46 is an antenna member 48 which is in communication with microwaves 50, during a desiccant regenerating cycle, which are generated by microwave generator 52. Waveguide 54 is oriented with respect to microwave generator 52 to receive the microwaves so generated from generator 52 and carry them to a portion of the antenna member 48A disposed within the waveguide. The microwaves are carried along the length of the antenna 48 which has a portion 48A extending outside of the chamber 46 and disposed within waveguide 54. Antenna 48 extends through chamber 46 having portion 48B mounted or disposed outside of desiccant 38 and another portion 48C within the chamber immersed within the desiccant. The microwave energy is conducted by antenna 48 and travels along its length into the chamber 46 carrying the desiccant 38. The microwave energy carried into chamber 46 is absorbed by the moisture held by the desiccant 38 which heats the moisture adsorbed by the desiccant and thereby release the moisture from the desiccant 38 to remove the moisture adsorbed by the desiccant 38 within the chamber. Thus in the interest of maintaining a relative continuous dry air flow through dry gas outlet 44, as mentioned above, one chamber 36 is drying wet gas 31 while the other regenerating chamber 46 is in the process of drying and regenerating desiccant 38 utilizing microwave energy as well as with heated drier or purge gas 40 as will be discussed more fully below. This process will be reversed once the desiccant 38 in chamber 36 becomes saturated.

Preferably microwave antenna 48 is a solid, rod shaped, elongated aluminum member. The aluminum antenna rod 48 has an outside surface which is substantially smooth to prevent arcing of the high frequency microwaves which are conducted by the aluminum antenna rod. However, it is contemplated that other shapes and configurations of antenna members may be used, as well as, various commonly known materials may be used in constructing the antenna member of the present invention.

Regenerative gas drying system 30 of this invention utilizes microwave antenna 48 as described above in conjunction with conduit 55 which is disposed in desiccant 38 of regenerating chamber 46 in which conduit 55 carries drier or dry gas 40, directed from adsorbing chamber 36 to regenerating chamber 46.

Drier gas 40, as seen in FIG. 1, exits the bottom portion of adsorbing chamber 36 at screen 42 and moves along exiting conduit 45 where a vast majority of the drier gas 40 exits dry gas outlet 44 for a desired use while a small percentage of drier gas 40 is diverted into a transport pipe 56. Transport pipe 56 moves drier gas 40 in a direction toward the upper area of chambers 36 and 46. Since chamber 46 in FIGS. 1 and 2 is being used to regenerate desiccant 38, shut off valve 59 is closed, preventing drier gas 40 from entering adsorbing chamber 36 while it is operating to dry wet gas 31, and shut off valve 61 is open permitting drier gas 40 to enter regenerating chamber 46 while contained in conduit 55.

This invention further includes means for heating the drier gas 40 carried in the conduit 55 which is disposed in desiccant 38 of regenerating chamber 46. This heating means includes the microwave energy transmitted from antenna 48 into desiccant 38 in which the energy is adsorbed by the moisture carried by desiccant 38. The moisture is heated by the microwave energy and in turn heats the surrounding desiccant 38 and conduit 55. As conduit 55 becomes heated the heat energy is in turn conducted to drier gas 40 carried by conduit 55. Thus, the temperature of drier gas 40 rises and is elevated over the temperature drier gas 40 was as it exited adsorbing chamber 36. This heated drier gas 40 carried in conduit 55 is removed from chamber 46 by an additional conduit 63 which is connected to conduit 55 which returns the now removed heated drier gas 40 to regenerating chamber 46 through additional conduit 63 being connected to purge gas inlet 58. As a result, purge or drier gas 40 now heated can be used to dry the saturated desiccant 38 contained in regenerating chamber 46.

Figure 2:
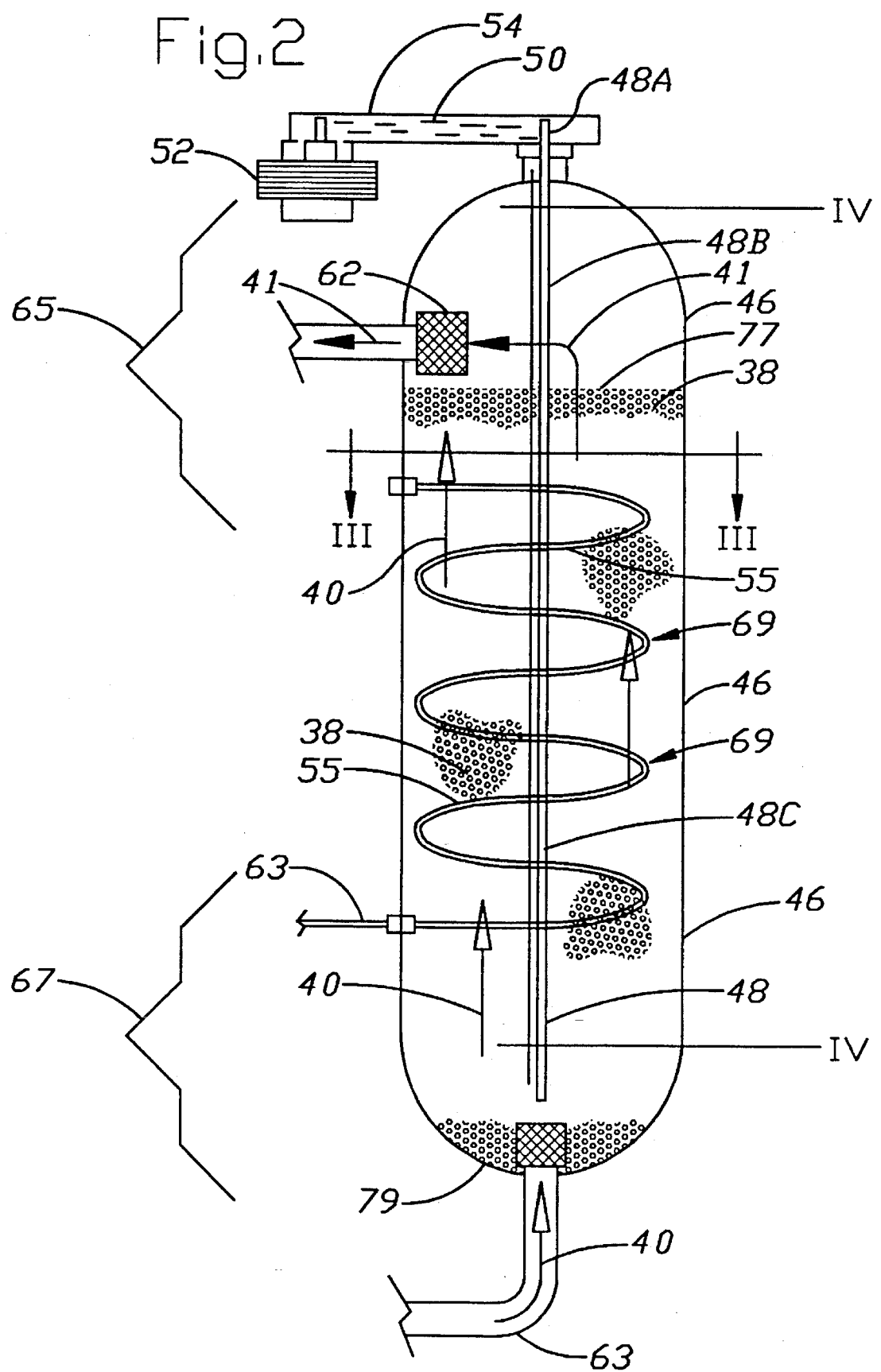
FIG. 2 is a schematic view of the regenerating chamber of the present invention.

As shown in FIG. 2, it is preferable for microwave antenna 48 to be inserted at one end of the regenerating chamber 46, which in this drawing is top portion 65 and in which the heated drier gas 40 returns to regenerating chamber 46 at another end or bottom portion 67 of regenerating chamber 46 opposite the top end at which microwave antenna 48 is inserted. As will be mentioned below, a higher moisture content of the desiccant is located in the upper region of chamber 46 and the microwave energy can be greatly used at that location while on the other hand the lower regions of desiccant 38 will contain less moisture of which will be desorbed by drier gas 40.

Conduit 55 is made of a conductive material such that the conduit carrying drier gas 40 acts as a secondary antenna to microwave antenna 48 in regenerating chamber 46. As a secondary antenna, microwave energy can be further distributed throughout desiccant 38. Additionally, by being conductive, conduit 55 readily conducts heat received from the surrounding heated moisture carried by desiccant 38 to drier gas 40 thereby elevating drier gas 40 as discussed above. With the temperature elevated in drier gas 40 it will work more effectively in drying desiccant 38 in chamber 46. There are many commonly known conductive materials which would be suitable such as aluminum that will perform well in conducting and transmitting microwaves as well as conducting heat.

Thus, the present invention provides a very efficient regenerative device in which microwave energy is transmitted into saturated desiccant and conduit 55 which carries drier gas 40 from adsorbing chamber 36 through desiccant 38 which is being exposed to microwave energy. Conduit 55 in turn retransmits the microwave energy for better dispersement of the energy throughout the saturated desiccant and conducts heat energy, to drier gas 40 contained in conduit 55, which is received from surrounding desiccant 38 carrying moisture that is being energized by the microwave energy. As a result, drier gas 40 becomes heated just prior to releasing it into regenerating chamber 46 to assist in drying desiccant 38 and moving moisture being desorbed from desiccant 38 to outlet 62 of chamber 46.

As shown in FIGS. 1–4, conduit 55 carrying drier gas 40 is made of hollow tubing which is shaped or configured into a helical coil shape. The helical coil shape of the hollow tubing has a plurality of adjacent turns 69. Adjacent turns 69 are spaced apart from each other. This spread out helical coil provides an efficient distribution of conduit 55 being disposed within desiccant 38. Other shapes or configurations that provide even distribution of conduit 55 are contemplated.

Figure 4:
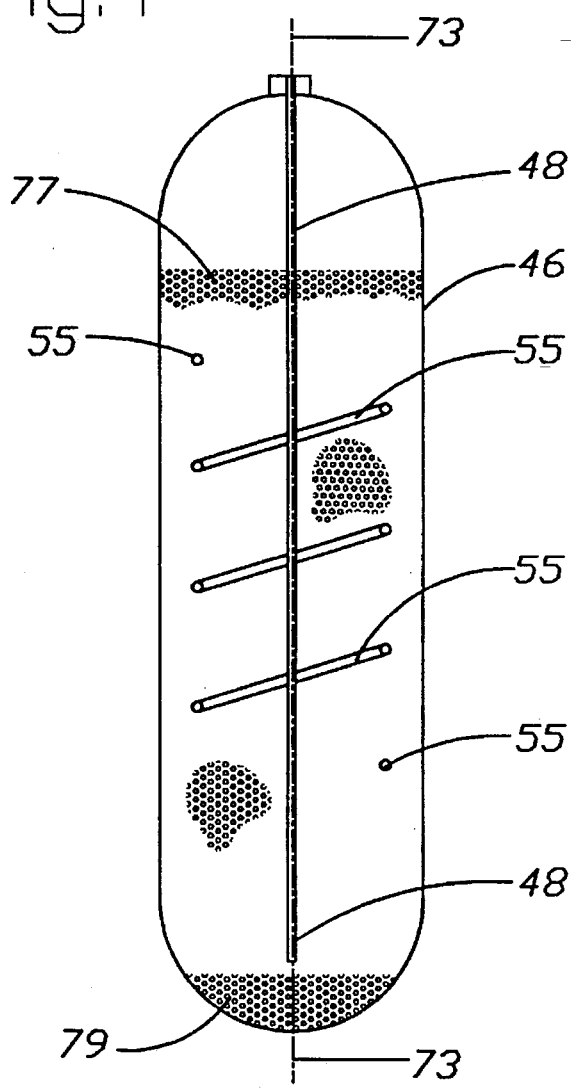
FIG. 4 is a cross sectional view along line IV—IV of FIG. 2.

In this particular configuration of conduit 55, adjacent turns 69 of the hollow tubing define an opening 71 in which microwave antenna 48 is positioned. This positioning of microwave antenna 48 within opening 71 of conduit 55 permits microwaves to radiate outwardly from antenna 48 and be retransmitted by conduit 55. It is further desired for efficient distribution to place microwave antenna 48 along central longitudinal axis 73 of opening 71 defined by adjacent turns 69, as shown in FIG. 4.

Figure 3A:
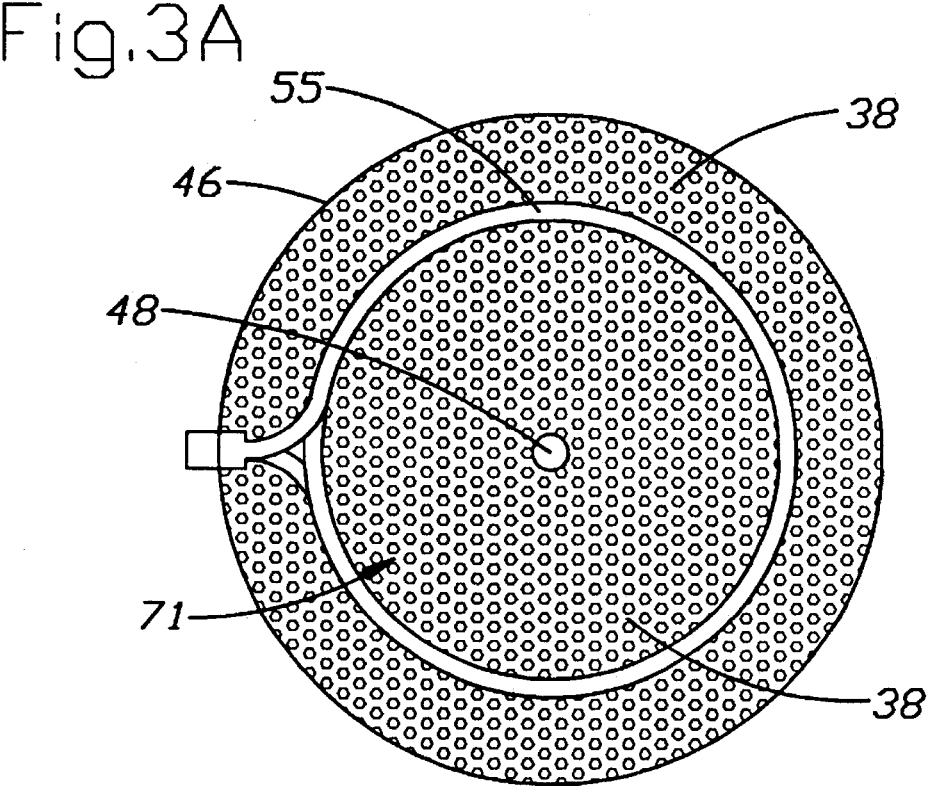
FIG. 3A is a cross sectional view along line III—III of FIG. 2.
Figure 3B:
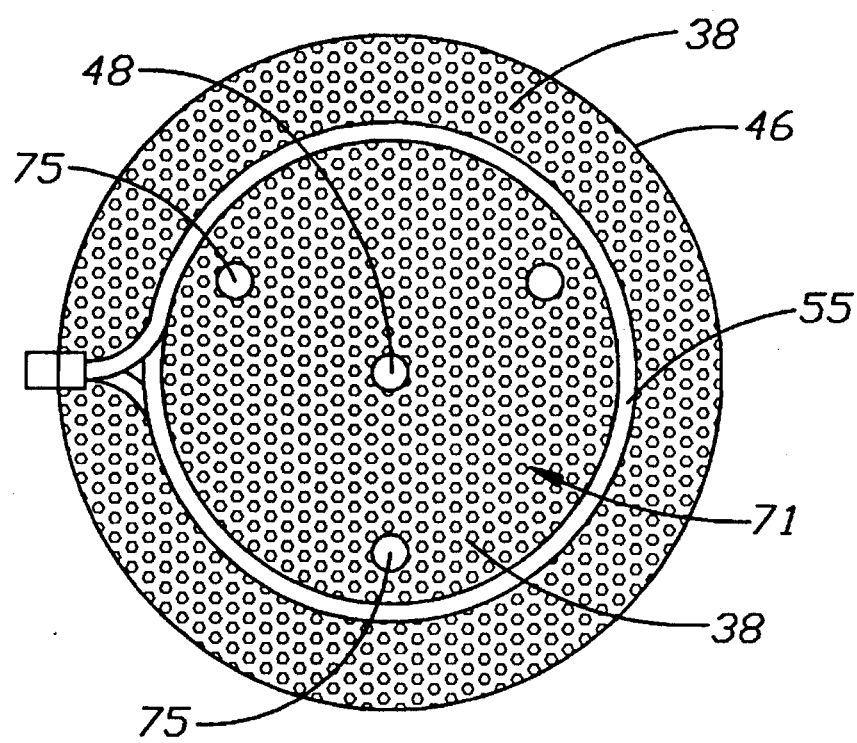
FIG. 3B is a cross sectional view along line III—III of FIG. 2 of another embodiment.
Figure 3C:
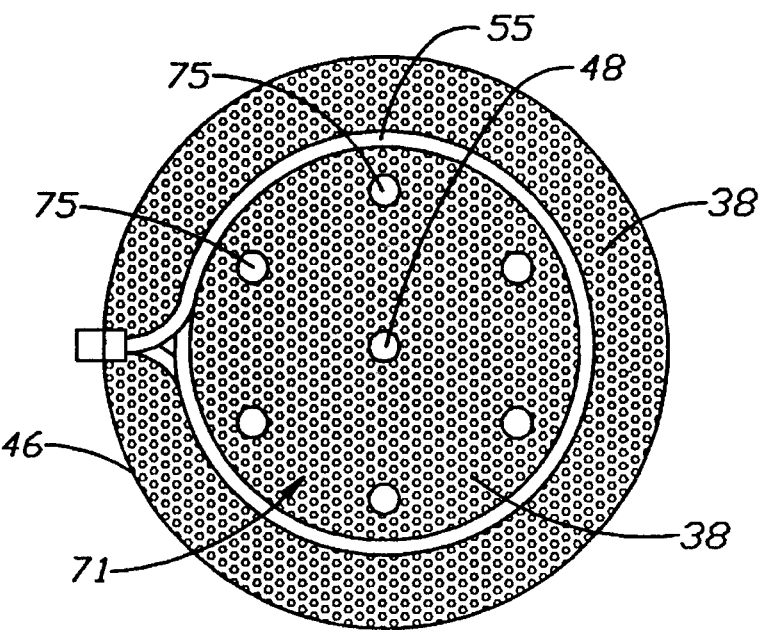
FIG. 3C is a cross sectional view along line III—III of FIG. 2 of another embodiment.

In other embodiments, as shown in FIGS. 3B and 3C, of the present invention a plurality of other microwave antennas 75 are placed within opening 71 substantially equally spaced apart and oriented in a substantially parallel direction to each other and to microwave antenna 48 positioned along central longitudinal axis 73 of opening 71.

With regard to conduit 55 being disposed within desiccant 38 stored in chamber 46, desiccant 38 forms a pair of ends 77 and 79, which corresponds to top end and bottom end 77,79 respectively, of the desiccant 38 in regenerating chamber 46. As can be seen in FIGS. 1 and 2 conduit 55 in the shape of a helical coil is positioned closer to one of the pair of desiccant ends 77, 79 than the other. In this embodiment it is preferable to position conduit 55 closer to top end 77 of the desiccant 38 than the other or bottom end 79. In this embodiment the top end 77 of desiccant 38 in chamber 46 has typically higher moisture content than bottom end 79, since in the drying of the air cycle, as seen in adsorbing chamber 36, wet gas 31 comes into the chamber from the top end 79 of desiccant 38. This moisture content will contribute to generating a higher level of heat with the exposure of microwave energy to the moisture which can in turn be conducted through conduit 55 to heat drier gas 40. Also, with the higher moisture content at the top portion of desiccant 38 in chamber 46 more distribution of microwave energy will be facilitated by conduit 55.

The present invention provides a method for drying desiccant 38 in regenerative gas drying system 30 having adsorbing chamber 36 and regenerating chamber 46 with both chambers containing desiccant 38 in which adsorbing chamber 36 receives wet gas 31 for adsorption of moisture by desiccant 38 contained therein to create a drier gas 40 and in which a portion of drier gas 40 exiting adsorbing chamber 36 is directed and carried to regenerating chamber 46 to dry desiccant 38 contained within regenerating chamber 46, which includes the step of positioning conduit 55 within desiccant 38 of regenerating chamber 46 in which conduit 55 carries drier gas 40 directed from adsorbing chamber 36 to regenerating chamber 46. The method further includes the step of positioning microwave antenna 48 in communication with microwaves generated by microwave generator 54 coupled with antenna 48 in which at least a portion of antenna 48 is positioned within desiccant 38 contained in regenerating chamber 46.

The method further includes regenerating chamber 46 having an upper and lower portions 65 and 67, respectively, in which the step of positioning microwave antenna 48 includes inserting antenna 48 through upper portion 65 of chamber 46 and downwardly into chamber 46 and into desiccant 38.

As can been seen in FIG. 2, the step of positioning microwave antenna 48 includes regenerative chamber 46 being filled with desiccant from bottom portion 67 of chamber 46 to a point below the top portion 65 of chamber 46 and placing antenna 48 to extend to a point in desiccant 38 above bottom portion 67 of chamber 46. It is desirable, as mentioned above to position antenna 48 along longitudinal axis of chamber 46.

As discussed earlier conduit 55 is formed of a conductive material such as aluminum and the like which will readily conduct heat and transmit microwave energy. The step of positioning conduit 55 within desiccant 38 includes placing conduit 55 in a spaced apart relationship to microwave antenna 48.

Also previously mentioned, conduit 55 is in the configuration of a helical coil in which adjacent turns 69 in the helical coil are spaced apart from one another, as shown in FIG. 2. Turns 69 of the helical coil define an opening in which the step of positioning conduit 55 preferably includes placing microwave antenna 48 within opening 71 defined by the helical coil.

The method also includes the step of carrying drier gas 40 through conduit 55 disposed in desiccant 38 and elevating the temperature of drier gas 40 higher than the temperature of drier gas 40 exiting adsorbing chamber 36, as described above in detail. As well as, carrying drier gas 40 of the elevated temperature to lower portion 67 of the regenerating chamber 46 through another conduit 63 and releasing drier gas 40 from another conduit 63 directly into regenerative chamber 46.

This method further includes the step of removing dry gas 40 which has been released directly into regenerative chamber 46 after it has adsorbed moisture formerly carried by desiccant 38 regenerative chamber 46, through outlet 62.

Advantageously, purge gas 40 is heated in an efficient and safe manner as it passes through conduit 55 and at the same time conduit 55 further distributes microwave energy throughout regenerating chamber 46.

While a detailed description of the preferred embodiments of the invention have been given, it should be appreciated that many variations can be made thereto without departing from the scope of the invention set forth in the appended claims.

I claim:

1. In a regenerative gas drying system having an adsorbing chamber and a regenerating chamber with both chambers containing desiccant in which the adsorbing chamber receives wet gas for adsorption of moisture by the desiccant contained therein to create a gas drier than the wet gas received by the desiccant chamber and in which a portion of the drier gas exiting the adsorbing chamber is directed and carried to the regenerating chamber to dry the desiccant contained within the regenerating chamber, the improvement being a regenerating chamber drier gas heating apparatus comprising:

a conduit disposed within the desiccant of the regenerating chamber in which the conduit carries the drier gas directed from the adsorbing chamber to the regenerating chamber; and a microwave antenna in communication with microwaves generated by a microwave generator coupled with the antenna in which at least a portion of the antenna is positioned within desiccant contained in the regenerating chamber.

2. The regenerative gas drying system of claim 1 including means for heating the drier gas carried in the conduit disposed in the desiccant of the regenerating chamber.

3. The regenerative gas drying system of claim 2 in which the heating means includes microwave energy transmitted from said antenna and said desiccant carrying moisture.

4. The regenerative gas drying system of claim 2 including means for removing the heated drier gas from the conduit disposed in the regenerating chamber, and means for returning the removed heated drier gas to the regenerating chamber to act as a purge gas to dry the saturated desiccant contained in the regenerating chamber.

5. The regenerative gas drying system of claim 4 in which the microwave antenna is inserted at one end of the regenerating chamber and in which the heated drier gas returns to the regenerating chamber at another end of the regenerating chamber opposite the one end at which the microwave antenna is inserted.

6. The regenerative gas drying device of claim 4 in which the returning means includes a purge gas inlet positioned at an opening of the regenerating chamber for receipt of purge gas to dry saturated desiccant within the chamber, and in which the removing means includes another conduit connected at one end to the conduit carrying the dry gas in the regenerating chamber is connected at another end to the purge gas inlet of the regenerating chamber.

7. The regenerative gas drying system of claim 2 in which the conduit is made of a conductive material such that the conduit carrying the drier gas acts as a secondary antenna to the microwave antenna in the regenerating chamber and conducts heat from said heating means to said drier gas carried by said conduit.

8. The regenerative gas drying system of claim 7 in which the conductive material is aluminum.

9. The regenerative gas drying system of claim 1 in which the conduit carrying the drier gas is hollow tubing configured into a helical coil shape disposed within the desiccant of the regenerating chamber.

10. The regenerative gas drying system of claim 9 in which the helical coil shape of the hollow tubing has a plurality of adjacent turns and in which said adjacent turns are spaced apart from each other.

11. The regenerative gas drying system of claim 10 in which said adjacent turns of the hollow tubing define an opening and in which the microwave antenna is positioned within the opening defined by the turns of the helical coil shape of the hollow tubing.

12. The regenerative gas drying system of claim 11 in which said opening defined by the turns of the helical coil shape of the hollow tubing has a central longitudinal axis along said opening and in which the microwave antenna is positioned along said central longitudinal axis of the opening.

13. The regenerative gas drying system of claim 12 including a plurality of other microwave antennas placed within said opening substantially equally spaced apart and oriented in a substantially parallel direction to each other and to the one microwave antenna positioned along the central longitudinal axis of the opening.

14. The regenerative gas drying device of claim 7 in which the desiccant stored within regenerating chamber forms a pair of ends in the regenerating chamber of the desiccant, and means for positioning the hollow tubing in the shape of said helical coil closer to one of the pair of desiccant ends in the regenerating chamber than to another of the pair of desiccant ends.

15. The regenerative gas drying device of claim 14 in which the one end at which the hollow tubing in the shape of said helical coil is positioned close to is a top end of the desiccant and the other end at which the coil is positioned further from is a bottom end of the desiccant within the regenerating chamber.

16. A method for drying desiccant in a regenerative gas drying system having an adsorbing chamber and a regenerating chamber with both chambers containing desiccant in which the adsorbing chamber receives wet gas for adsorption of moisture by the desiccant contained therein to create a drier gas and in which a portion of the drier gas exiting the adsorbing chamber is directed and carried to the regenerating chamber to dry the desiccant contained within the regenerating chamber, comprising the steps of:

positioning a conduit within the desiccant of the regenerating chamber in which the conduit carries the drier gas directed from the adsorbing chamber to the regenerating chamber; and positioning a microwave antenna in communication with microwaves generated by a microwave generator coupled with the antenna in which at least a portion of the antenna is positioned within desiccant contained in the regenerating chamber.

17. The method of claim 16 in which the regenerating chamber has an upper and lower portion in which the step of positioning the microwave antenna includes inserting the antenna through the upper portion of the chamber and downwardly into the chamber and into the desiccant.

18. The method of claim 17 in which the step of positioning the microwave antenna includes the regenerative chamber being filled with desiccant from the bottom portion of the chamber to a point below the top portion of the chamber and placing the antenna to extend to a point in the desiccant above the bottom portion of the chamber.

19. The method of claim 17 in which the step of positioning includes placing the antenna along a longitudinal axis of said chamber.

20. The method of claim 16 in which the conduit is formed of a conductive material in which the step of positioning the conduit within the desiccant includes placing the conduit in a spaced apart relationship to the microwave antenna.

21. The method of claim 20 in which the conduit is in the configuration of a helical coil in which adjacent turns in the helical coil are spaced apart from one another.

22. The method of claim 21 includes the turns of the helical coil defining an opening in which the step of positioning the conduit includes placing said microwave antenna within said opening defined by said helical coil.

23. The method of claim 16 includes the step of carrying said drier gas through said conduit disposed in said desiccant, elevating a temperature of said drier gas higher than the temperature of said drier gas exiting said adsorbing chamber, and carrying said drier gas of elevated temperature to a lower portion of the regenerative chamber through another conduit and releasing said drier gas from said another conduit directly into the regenerative chamber.

24. The method of claim 23 includes the step of removing said dry gas which has been released directly into the regenerative chamber after it has adsorbed moisture carried by the desiccant in the regenerative chamber.

* * * * *

UNITED STATES PATENT AND TRADEMARK OFFICE
CERTIFICATE OF CORRECTION

PATENT NO. : 5,581,903
DATED : December 10, 1996
INVENTOR(S) : Leon A. Botich

It is certified that error appears in the above-indentified patent and that said Letters Patent is hereby corrected as shown below:

Col. 9, line 4, Claim 14, change "7" to -9-.

Col. 10, line 27, Claim 23, change "the" to -a-.

Signed and Sealed this

Eleventh Day of March, 1997

Attest:

BRUCE LEHMAN

*Attesting Officer*  *Commissioner of Patents and Trademarks*